Aug. 21, 1951     J. D. MYERS ET AL     2,565,256

HEATED MIRROR

Filed April 4, 1949

James D. Myers
Calhoun Waddell
Nathaniel P. Myers
Inventors

By C. James Cottrell
                     Attorney

Patented Aug. 21, 1951

2,565,256

UNITED STATES PATENT OFFICE 2,565,256

HEATED MIRROR

James D. Myers, Calhoun Waddell, and Nathaniel P. Myers, Philadelphia, Pa.

Application April 4, 1949, Serial No. 85,394

3 Claims. (Cl. 219—19)

This invention relates to improvements in heated mirrors, and more particularly to the provision of a heated mirror for use on the outside of the enclosed portion of an automobile or the like.

In the usual automobile, there is mounted a rear view mirror above the wind shield inside of the enclosed portion of the automobile. In inclement weather where fog, sleet, snow, rain or the like is encountered, such a rear view mirror is ineffective as the rear window of the automobile becomes clouded and opaque and a view of objects in the rear of the automobile is prevented. While devices have been provided for heating the rear window and wind shield, such devices are effective only on particular types of rear windows and are not adapted for use on all types of automobiles. The view of objects in the rear of the automobile by means of the mirror and rear window is not clear and is often confusing. This is especially true on automobiles of the convertible type and other automobiles where clearing of the rear window is impractical. Also, a rear view mirror on the outside of the enclosure is found desirable on all types of automobiles as a better rear view is possible when the mirror is so positioned. Heretofore, such outside rear view mirrors have been found objectionable as they become clouded from fog, sleet, snow, etc.

It is, therefore, an object of this invention to provide a heated mirror adapted to be positioned outside of the enclosure of an automobile to enable a clear view of objects behind the automobile.

A further object is to provide a heated rear view mirror for the outside of an automobile, which mirror is tightly enclosed in a casing firmly supported by the body of an automobile so that parts will not be loosened by the vibrations of the automobile.

A further object is to provide a heated mirror device for the outside of an automobile, which device is of simple structure, rugged, and easy to assemble.

These and other objects are attained by the novel construction and arrangement of parts hereinafter described and illustrated by the accompanying drawings, forming a part hereof, and in which.

Figure 1:
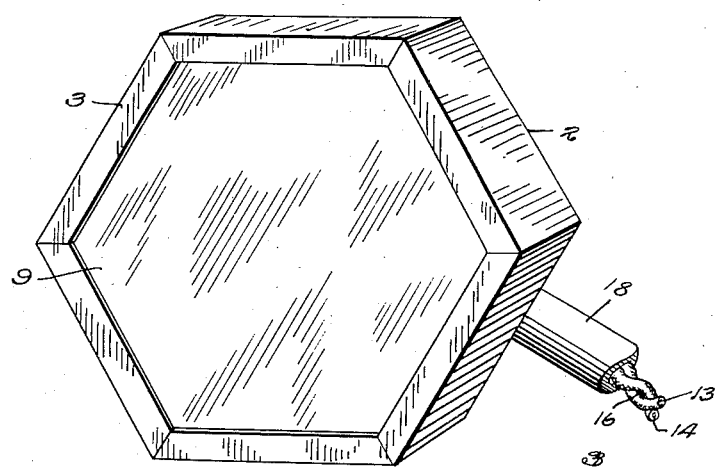
Fig. 1 is a perspective view of a rear view mirror device embodying the invention.
Figure 3:
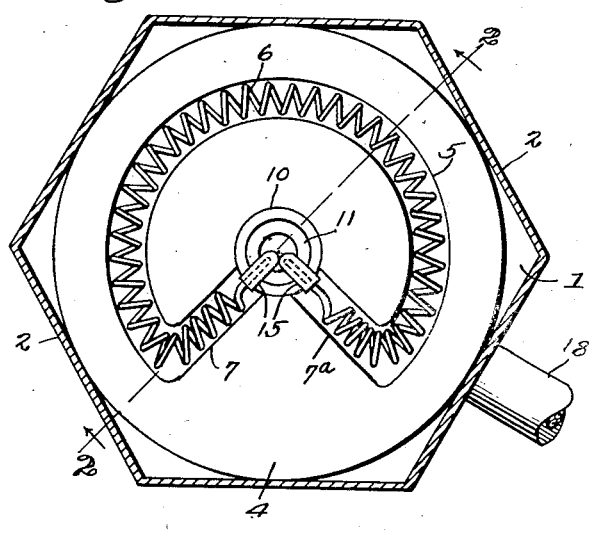
Fig. 3 is a sectional view taken on the line 3—3 of Fig. 2.
Figure 2:
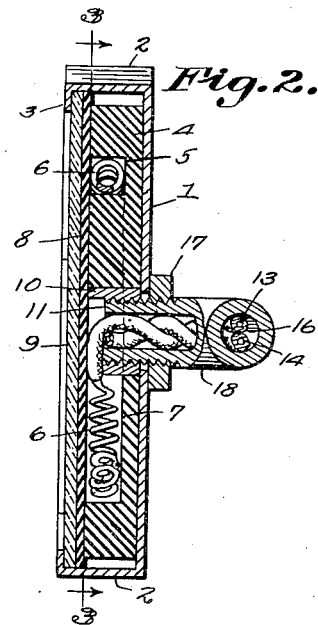
Fig. 2 is a sectional view taken on the line 2—2 of Fig. 1.

Referring to the drawings, the rear view mirror is shown to comprise a casing, substantially hexagonal in shape, having a back 1, sides 2, and flanges 3. Positioned against the back 1 is a plate 4 of insulating material having grooves 5 in which are positioned a heating coil 6, of suitable electrical resistance. The coil 6 and plate 4 are covered by a sheet 8 of electrical insulating material, which is positioned against the back of a mirror 9. The mirror 9, sheet 8, and plate 4 are tightly clamped by means of the back 1 and the flanges 3.

The plate 4 and sheet 8 may be made of any electrical insulating material, such as mica, asbestos, and the like.

The plate 4 has a center hole in which is positioned a cylindrical tube 10 which abuts and is positioned by the back 1 and the sheet 8.

The tube 10 is internally threaded, and threadedly attached to a pipe end 11, which pipe is extended as shown at 18 and passes through a hole in the center of the back 1, the last mentioned hole having a diameter less than the diameter of the hole in the plate 4.

The extension 18 of the pipe has external threads which threadedly engage a nut 17 which cooperates with the outside of the back of the casing to hold the parts tightly together and to limit the extent of the end 11 in the tube 10.

The plate 4 has a pair of angularly directed grooves 7 and 7a which communicate with groove 5 and the hole in the center of plate 4, so that the ends of the coil 6 of electrical heating wire can be passed through a slot 15 in one end of tube 10 and connected to the wires 13 and 14 of an electrical cord having an insulating cover 16, the cord passing through the pipe 18 to a switch on the dash board or elsewhere in the automobile (not shown).

From the above description it will be seen that there has been provided an outside rear view mirror for automobiles, which can be conveniently heated from the storage battery of the automobile to prevent clouding in inclement weather. A switch on the dashboard connects the wires 13, 14 to a storage battery.

The above description is to be considered as descriptive and not limitative of the invention of which modifications may be made without departing from the spirit and scope of the appended claims.

The invention having been described, what is claimed is:

1. In a rear view mirror for an automobile, a casing having a back and sides and flanges on the sides, a plate of insulating material positioned against the back, said plate and back having holes in their centers, the hole in the back being of less diameter than the hole in the plate, said plate having a groove, a coil of electrical heating wire positioned in the grove, a sheet of insulating material covering the coil, a mirror having its back abutting the sheet, said flanges and back clamping the sheet and mirror and plate together, a tube positioned in the hole in the plate and abutting the sheet and the back of the casing, a pipe having one end threadedly engaging the interior of the tube, electric wires passing through the pipe and connected to the ends of the coil, said pipe passing through the hole in the back, and means to clamp the pipe to the back.

2. The structure set forth in claim 1 further characterized by said means to clamp the pipe to the back comprising a nut threadedly engaging the pipe and abutting the outside of the back.

3. The structure set forth in claim 2 further characterized by the groove in the plate having angularly directed portions communicating with the hole in the plate, said tube having a slot in one end thereof, said angularly directed portions of the groove and the slot acting to direct the ends of the coil and wires for connection.

JAMES D. MYERS.
CALHOUN WADDELL.
NATHANIEL P. MYERS.

REFERENCES CITED

The following references are of record in the file of this patent:

UNITED STATES PATENTS

| Number | Name | Date |
| --- | --- | --- |
| 1,522,206 | Rankin | Jan. 6, 1925 |
| 1,934,110 | Wilson | Nov. 7, 1933 |
| 2,432,169 | Morgan et al. | Dec. 9 1947 |